(12) United States Patent
Rasband et al.

(10) Patent No.: US 10,152,864 B2
(45) Date of Patent: Dec. 11, 2018

(54) DISTRIBUTED RULES ENGINES FOR ROBUST SENSOR NETWORKS

(71) Applicant: Tyco Fire & Security GmbH, Neuhausen am Rheinfall (CH)

(72) Inventors: Paul B. Rasband, Fremont, CA (US); Craig Trivelpiece, Mission Viejo, CA (US); Stewart E. Hall, Wellington, FL (US); Robert F. Brewin, Honoolulu, HI (US); Gustavo Leon, Tamarac, FL (US); Richard Campero, Gilroy, CA (US)

(73) Assignee: Tyco Fire & Security GmbH, Neuhausen aim Rheinfall (CH)

( * ) Notice: Subject to any disclaimer, the term of this patent is extended or adjusted under 35 U.S.C. 154(b) by 600 days.

(21) Appl. No.: 14/464,070

(22) Filed: Aug. 20, 2014

(65) Prior Publication Data
US 2015/0286934 A1 Oct. 8, 2015
US 2017/0323547 A9 Nov. 9, 2017

Related U.S. Application Data

(60) Provisional application No. 61/973,962, filed on Apr. 2, 2014, provisional application No. 61/946,054, filed on Feb. 28, 2014.

(51) Int. Cl.
*G08B 13/24* (2006.01)
*G01S 5/02* (2010.01)
(Continued)

(52) U.S. Cl.
CPC ............ *G08B 13/2451* (2013.01); *G01S 5/02* (2013.01); *G01S 5/0236* (2013.01); *G01S 5/0284* (2013.01);
(Continued)

(58) Field of Classification Search
CPC ........ G01S 5/0294; G01S 5/0284; G01S 5/02; G01S 5/0236; G06K 9/00; G06N 5/027;
(Continued)

(56) References Cited

U.S. PATENT DOCUMENTS

2007/0239350 A1 10/2007 Zumsteg et al.
2008/0010631 A1* 1/2008 Harvey .................... G06F 8/36
717/131

(Continued)

FOREIGN PATENT DOCUMENTS

| CN | 202475489 | 10/2012 |
| WO | WO 01/06401 | 1/2001 |
| WO | WO 2013/159217 | 10/2013 |

OTHER PUBLICATIONS

Hill J. et al., "The Platforms Enabling Wireless Sensor Networks", Communications of the ACM, Jun. 2004, vol. 47, No. 6.*
(Continued)

*Primary Examiner* — Dave Misir
(74) *Attorney, Agent, or Firm* — Fish & Richardson P.C.

(57) ABSTRACT

A networked system for managing a physical intrusion detection/alarm includes an upper tier of server devices, comprising: processor devices and memory in communication with the processor devices, a middle tier of gateway devices that are in communication with upper tier servers, and a lower level tier of devices that comprise fully functional nodes with at least some of the functional nodes including an application layer that execute routines to provide node functions, and a device to manage the lower tier of devices, the device instantiating a program manager that executes a state machine to control the application layer in each of the at least some of the functional nodes.

13 Claims, 8 Drawing Sheets

(51) Int. Cl.

| | | |
|---|---|---|
| *G08B 25/10* | (2006.01) | |
| *G06N 5/02* | (2006.01) | |
| *H04L 29/08* | (2006.01) | |
| *H04W 84/18* | (2009.01) | |
| *G08B 13/00* | (2006.01) | |
| *G08B 13/196* | (2006.01) | |
| *H04N 7/18* | (2006.01) | |
| *G08B 13/22* | (2006.01) | |
| *H04L 12/741* | (2013.01) | |
| *H04W 88/16* | (2009.01) | |
| *G06K 9/00* | (2006.01) | |
| *H04W 4/00* | (2018.01) | |
| *G08B 7/06* | (2006.01) | |
| *H04W 4/02* | (2018.01) | |

(52) U.S. Cl.
CPC .............. *G01S 5/0294* (2013.01); *G06K 9/00* (2013.01); *G06N 5/027* (2013.01); *G08B 13/00* (2013.01); *G08B 13/19613* (2013.01); *G08B 13/22* (2013.01); *G08B 13/2491* (2013.01); *G08B 25/10* (2013.01); *H04L 45/74* (2013.01); *H04L 67/10* (2013.01); *H04N 7/181* (2013.01); *H04W 4/008* (2013.01); *H04W 4/028* (2013.01); *H04W 84/18* (2013.01); *H04W 88/16* (2013.01); *G08B 7/062* (2013.01); *H04W 4/02* (2013.01)

(58) Field of Classification Search
CPC . G06N 5/00; G06N 5/025; G06N 5/02; G08B 7/062; G08B 13/00; G08B 13/19613; G08B 13/22; G08B 13/2491; G08B 25/10; H04L 45/74; H04L 67/10; H04L 29/08; H04N 7/181; H04W 4/008; H04W 4/02; H04W 4/028; H04W 84/18; H04W 88/16; G06F 9/44; G06F 15/16; G06F 15/173; G06F 15/17362; G06F 15/18
USPC ............................................................ 706/47
See application file for complete search history.

(56) References Cited

U.S. PATENT DOCUMENTS

| | | | |
|---|---|---|---|
| 2008/0068267 | A1 | 3/2008 | Huseth |
| 2008/0259919 | A1* | 10/2008 | Monga .................... H04L 43/12 370/389 |
| 2010/0217651 | A1 | 8/2010 | Crabtree et al. |
| 2011/0051656 | A1 | 3/2011 | Hethuin et al. |
| 2011/0310779 | A1* | 12/2011 | De Poorter ............. H04W 4/00 370/310 |
| 2011/0310791 | A1 | 12/2011 | Prakash et al. |
| 2012/0158161 | A1* | 6/2012 | Cohn .................. H04L 12/2827 700/90 |
| 2012/0311614 | A1 | 12/2012 | Deanna et al. |
| 2013/0003645 | A1 | 1/2013 | Shapira et al. |
| 2013/0064233 | A1 | 3/2013 | Hethuin et al. |

OTHER PUBLICATIONS

International Search Report and Written Opinion, PCT/US15/17924.
International Search Report and Written Opinion, PCT/US15/17702.
International Search Report and Written Opinion, PCT/US15/17680.

* cited by examiner

DISTRIBUTED RULES ENGINES FOR ROBUST SENSOR NETWORKS

CLAIM OF PRIORITY

This application claims priority under 35 U.S.C. §119(e) to provisional U.S. Patent Application 61/973,962, filed on Apr. 2, 2014, entitled: "Wireless Sensor Network", and to provisional U.S. Patent Application 61/946,054, filed on Feb. 28, 2014, entitled: "Wireless Sensor Network", the entire contents of which are hereby incorporated by reference.

BACKGROUND

This description relates to operation of sensor networks such as those used for security, intrusion and alarm systems installed on commercial or residential premises.

It is common for businesses and homeowners to have a security system for detecting alarm conditions at their premises and signaling the conditions to a monitoring station or to authorized users of the security system. Security systems often include an intrusion detection panel that is electrically or wirelessly connected to a variety of sensors. Those sensors types typically include motion detectors, cameras, and proximity sensors (used to determine whether a door or window has been opened). Typically, such systems receive a very simple signal (electrically open or closed) from one or more of these sensors to indicate that a particular condition being monitored has changed or become unsecure.

Government entities, companies, academic institutions, etc. issue credentials to employees, contractors, students, etc. to control access to buildings and facilities, indoors and outdoors. Individuals who bypass security systems to gain access, either intentionally or unintentionally, are difficult to identify and locate.

Many devices use a rules engine as a subcomponent for processing rules that control and monitor processes or devices. The execution of rules may produce no output as when monitoring devices update internal values and processes, or execution of rules may be indication that a rule has fired (executed). As a subcomponent, rules and data updates are sent to the rules engine and rules either fire or do not fire. In a typical system, another component evaluates the output of the rules engine and determines an action to take such as where results should be sent or if additional processes are needed or if the rule is chained to other rules or in a general sense how to route the outputs from firing of the rules.

SUMMARY

The specifics of the data gathering system includes a network of multiple sensors that collect data as well as a system to determine from the sensor data that monitor events and locations of events. A connection to the indicators could be wired and powered network or could be wireless. Detection sensors include some or all of Fire and Smoke and Toxic gas or chemical detectors, alarm boxes, audio detectors, structural change detectors, people counters, and motion sensors. These detectors/sensors report location data as well as raw sensor data.

A device node includes a processor running an operating system, and memory in communication with the processor, the processor configured to receive an independent software agent from a first tier in a network, with the software agent being a dynamically loaded "root function" that includes at least one rule, and execute the at least one rule included in the independent software agent by the operating system of the end-node according to an established function priority for the node.

One or more advantages may be provided from one or more of the above aspects.

Similarly, data inputs and rules updates to a rules engine typically come from a single source that is controlling the rules engine and then interfacing with the rest of the system. These typical implementations require significant additional software and configuration to properly perform and to route rules, data and actions. Depending upon the complexity it can be very difficult to manage and maintain the proper configurations for such a system. Enhancing complex rules with additional functions is problematic due to execution time and stability of the additional functions interfering with the timely execution of the rules engine. In complex control systems, routing the decisions and actions from a rules engine can be a major portion of the effort.

The details of one or more embodiments of the invention are set forth in the accompanying drawings and the description below. Other features, objects, and advantages of the invention are apparent from the description and drawings, and from the claims.

DETAILED DESCRIPTION

Described herein are examples of network features that may be used in various contexts including, but not limited to, security/intrusion and alarm systems. Example security systems may include an intrusion detection panel that is electrically or wirelessly connected to a variety of sensors. Those sensors types may include motion detectors, cameras, and proximity sensors (used, e.g., to determine whether a door or window has been opened). Typically, such systems receive a relatively simple signal (electrically open or closed) from one or more of these sensors to indicate that a particular condition being monitored has changed or become unsecure.

For example, typical intrusion systems can be set-up to monitor entry doors in a building. When a door is secured, a proximity sensor senses a magnetic contact and produces an electrically closed circuit. When the door is opened, the proximity sensor opens the circuit, and sends a signal to the panel indicating that an alarm condition has occurred (e.g., an opened entry door).

Data collection systems are becoming more common in some applications, such as home safety monitoring. Data collection systems employ wireless sensor networks and wireless devices, and may include remote server-based monitoring and report generation. As described in more detail below, wireless sensor networks generally use a combination of wired and wireless links between computing devices, with wireless links usually used for the lowest level connections (e.g., end-node device to hub/gateway). In an example network, the edge (wirelessly-connected) tier of the network is comprised of resource-constrained devices with specific functions. These devices may have a small-to-moderate amount of processing power and memory, and may be battery powered, thus requiring that they conserve energy by spending much of their time in sleep mode. A typical model is one where the edge devices generally form a single wireless network in which each end-node communicates directly with its parent node in a hub-and-spoke-style architecture (also known as a star topology). The parent node may be, e.g., an access point on a gateway or a sub-coordinator which is, in turn, connected to the access point or another sub-coordinator.

Figure 1:
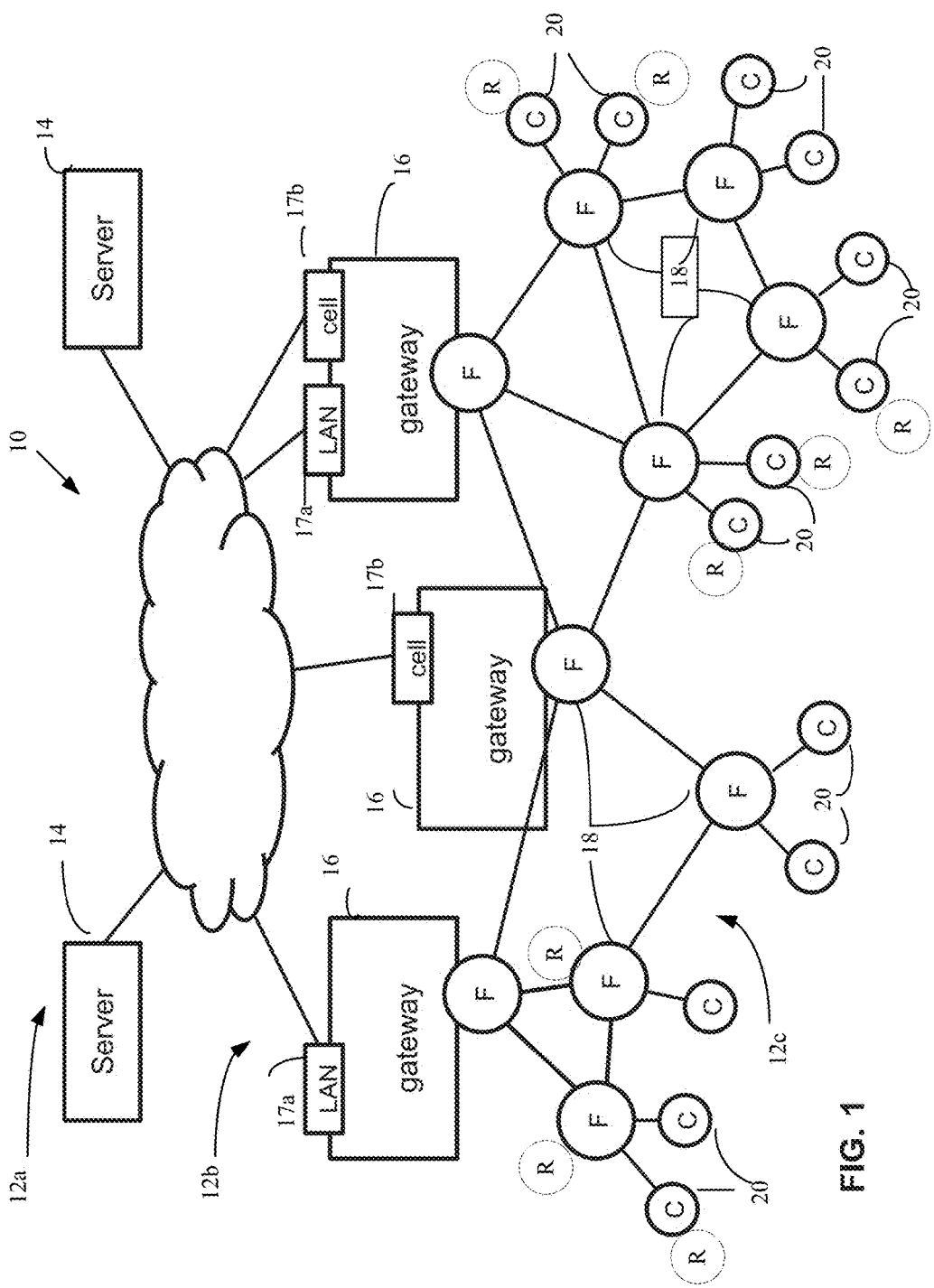
FIG. 1 is a schematic diagram of an exemplary networked security system.

Referring now to FIG. 1, an exemplary (global) distributed network topology for a Wireless Sensor Network (WSN) is shown. In FIG. 1 the distributed network 10 is logically divided into a set of tiers or hierarchical levels 12a-12c.

The global distributed network topology for the sensor network includes distributed rule engines denoted by the circle element "R" at individual nodes or collections of nodes. In an upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

The distributed network 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 10.

Constrained computing devices 20 as used herein are devices with substantially less persistent and volatile memory other computing devices, sensors in a detection system. Currently examples of constrained devices would be those with less than about a megabyte of flash/persistent memory, and less than 10-20 kbytes of RAM/volatile memory). These constrained devices 20 are configured in this manner, generally due to cost/physical configuration considerations.

In a typical network, the edge (wirelessly-connected) tier of the network is comprised of highly resource-constrained devices with specific functions. These devices have a small-to-moderate amount of processing power and memory, and often are battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway is equipped with an access point (fully functional node or "F" node) that is physically attached to that gateway and that provides a wireless connection point to other nodes in the wireless network. The links (illustrated by lines not numbered) shown in FIG. 1 represent direct (single-hop network layer) connections between devices. A formal networking layer (that functions in each of the three tiers shown in FIG. 1) uses a series of these direct links together with routing devices to send messages (fragmented or non-fragmented) from one device to another over the network.

The WSN 10 implements a state machine approach to an application layer that runs on the lower tier devices 18 and 20. Discussed below is an example of a particular implementation of such an approach. States in the state machine are comprised of sets of functions that execute in coordination, and these functions can be individually deleted or substituted or added to in order to alter the states in the state machine of a particular lower tier device.

The WSN state function based application layer uses an edge device operating system (not shown, but such as disclosed in the above mentioned provisional application) that allows for loading and execution of individual functions (after the booting of the device) without rebooting the device (so-called "dynamic programming"). In other implementations, edge devices could use other operating systems provided such systems allow for loading and execution of individual functions (after the booting of the device) preferable without rebooting of the edge devices.

Figure 2:
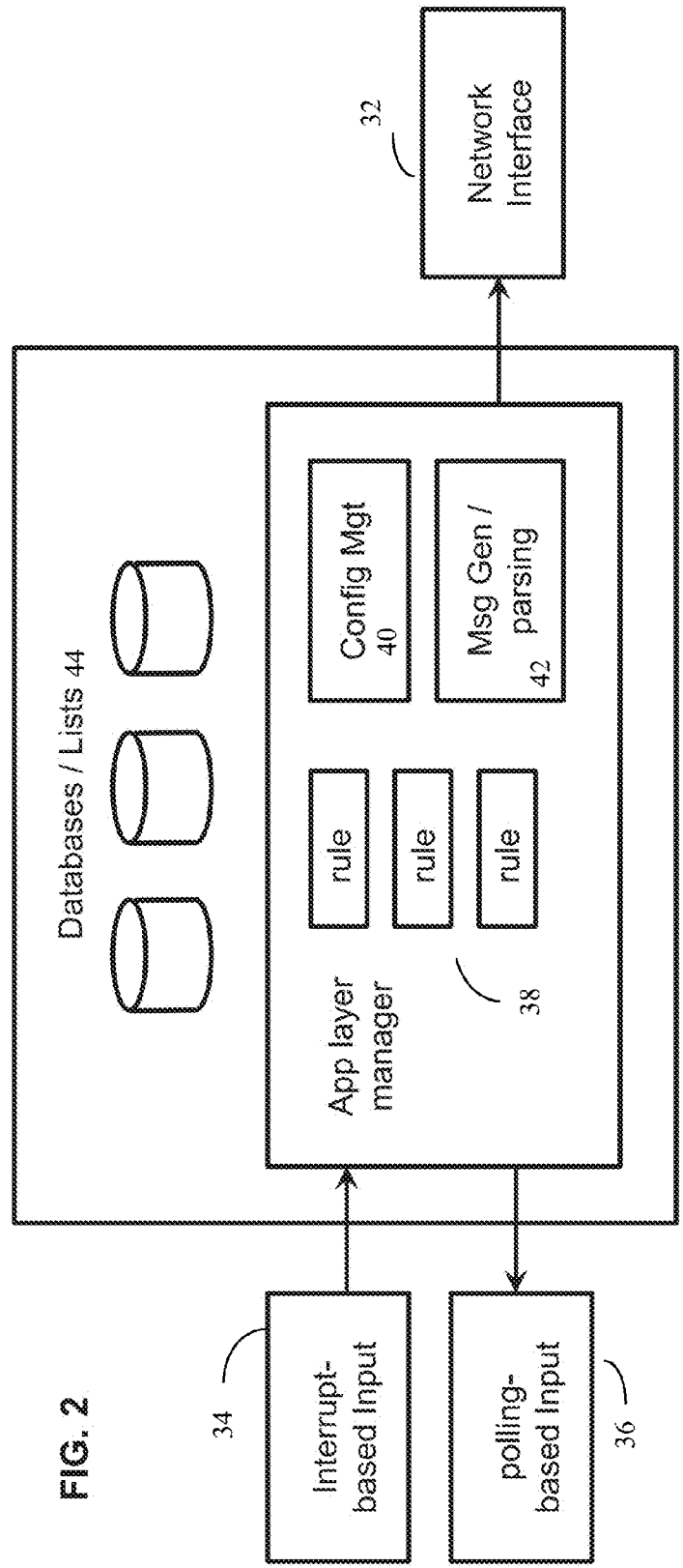
FIG. 2 is a block diagram of generic application layer manager.

Referring now to FIG. 2, an embodiment an application layer manager 30 is shown. The application layer manager 30 is generic in the sense that the application layer manager 30 does not depend upon specific application solution or "business" logic details in the devices that are updated, e.g., devices 18, 20 (lower tier 12c FIG. 1). The application layer manager 30 handles "pass-offs" (changes in functions currently operating) from function to function, on, e.g., the nodes, e.g., devices 18, 20. These pass-offs are requested by actual state functions executing in the nodes or devices 18, 20.

The application layer manager 30 accomplishes such "pass-offs" (changes in functions currently operating) using a transition table (FIG. 4) that serves as a central descriptor for the state functions. Inputs to the application layer manager 30 include parsed messages from the network layer via interface 32. The application layer manager 30 includes interrupt and polling based inputs via processor peripheral interrupts from interrupt interface 34 and polled sensor/peripheral inputs via interface 36.

The application layer manager 30 involves characterizing inputs sufficiently to apply rules 38 that dictate changes in configuration, stored data, and/or precipitate message generation. The application layer manager 30 has rules 38 and a configuration manager 40 as well as a message generator/parser 42. The application layer manager 30 uses network message and sensor/processor peripheral based inputs, local data stores 44 (for transition table) and lists, configuration management functions, rules set, and report generation capabilities as shown.

Edge Application Layer Architecture

Figure 3:
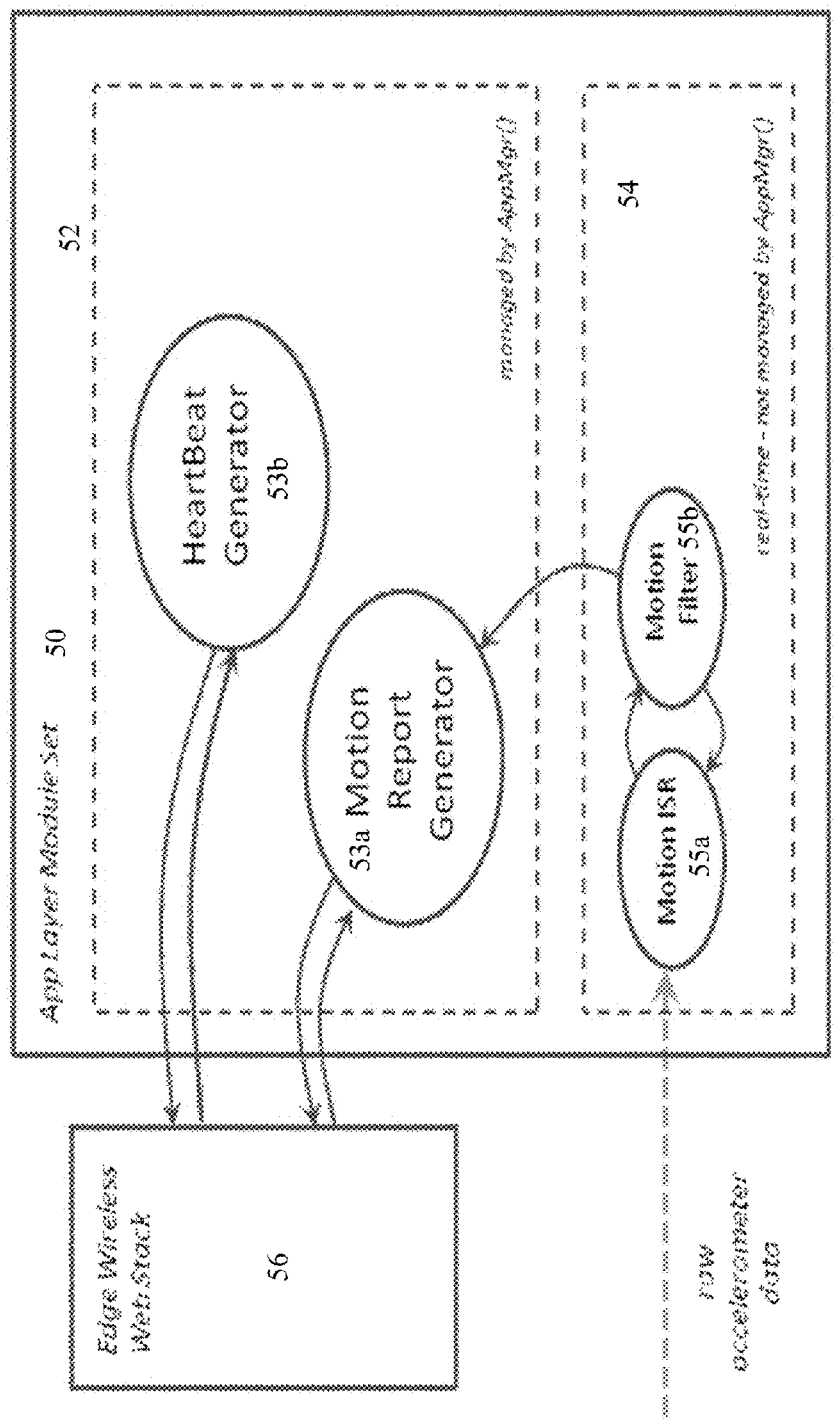
FIG. 3 is a block diagram showing an example process on the application layer manager.

Referring to FIG. 3, an application module set 50 includes an application layer 50 for the edge devices 18 and 20 (FIG. 1) is shown. The application module set 50 includes a layer 52 that is managed by the application layer manager (FIG. 4) and a layer 54 that is not managed by the application layer manager. In this embodiment, the application layer manager is separate from, e.g., isolated from these other firmware modules used at the edge of the WSN (e.g., wireless web modules, etc. not shown) in order to apply changes in the application layer code without requiring changes to code in these other modules. In addition, as shown real-time processing of motion ISR and motion filter are not handled by the application layer manager, whereas motion report generator and heart beat generator are handled by the application layer manager.

The application module set 50 depicted in the example of FIG. 3 includes functions managed by the application layer, e.g., a motion report generator 53a and heartbeat generator 53b that are in communication with a stack 56. Changes to the application layer 52 are possible by having an understanding of the details of the workings of the application layer 52 without the need to fully understand all of the details of these other isolated modules. This is desirable as different groups of individuals and/or systems may be tasked with the coding and maintenance of the respective modules. Also, the application layer 52 is configured in a general way that supports the upgrading of portions of the application layer (e.g., individual business rules, reports, filters, and other functions) without requiring updating of the entire application layer.

FIG. 3 in addition depicts a state diagram among various processes running in the application module set and with interaction with a transition table as set out below.

| Function Name (assigned externally) | Function ID (assigned externally) | Allowed Transitions (assigned externally) | Function Index (assigned by AppMgr) | Execution Type (assigned externally) |
|---|---|---|---|---|

Figure 4:
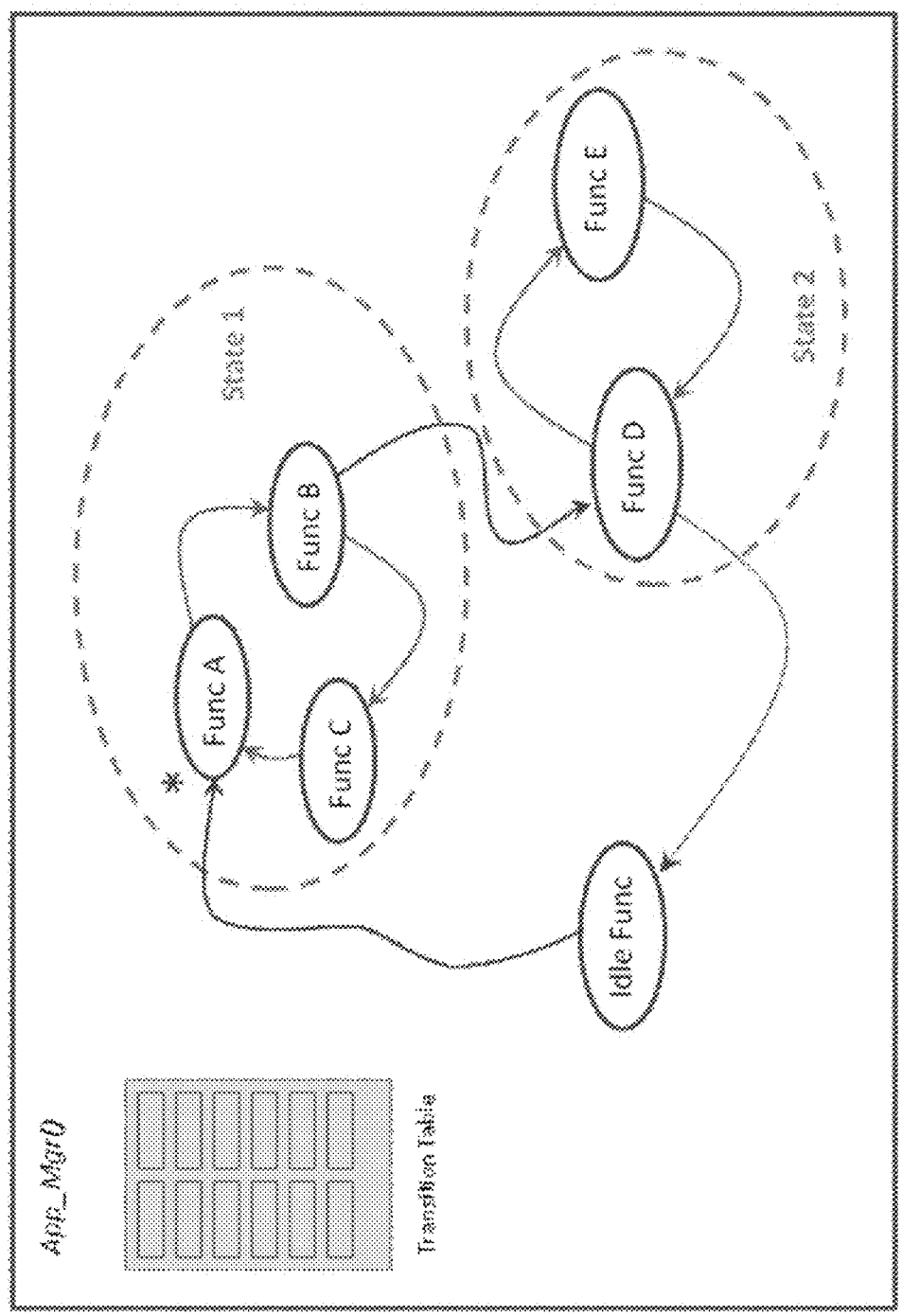
FIG. 4 is a diagram of exemplary state transitions on the application layer manager.

Referring now to FIG. 4, an exemplary situation involving the Application layer manager 50 (App_Mgr( )) where there are two states (State 1 with functions A, B, and C, and State 2 with functions D and E) is shown. The transition table governs state transitions.

The transition table shows what state (or states in the case of a nondeterministic finite automaton) a finite semi-automaton or finite state machine will move to, based on the current state of the machine and other inputs. A state table is essentially a truth table in which some of the inputs are the current state and the outputs include the next state along with other outputs. A state table is one of several ways to specify a state machine, other ways being a state diagram, and a characteristic equation.

State 1 is the normal state and has an entry point, "Func A." Normally, State 1 executes "Func A" which requests "Func B" which requests execution of "Func C." In the example, a condition occurs (actual condition is implementation specific and the detail of which is not necessary to understand what follows). Under this situation with the condition occurring State 1 transitions to State 2 when "Func B" requests execution of "Func D" rather than "Func C." State 2 may exists for only one cycle (D-E-exit) or many cycles (D-E-D-E- . . . -exit). However, when the exit occurs in this example, it does so without calling any function. By default then, the AppMgr's Idle function runs Func A since it is the entry point function.

Figure 5:
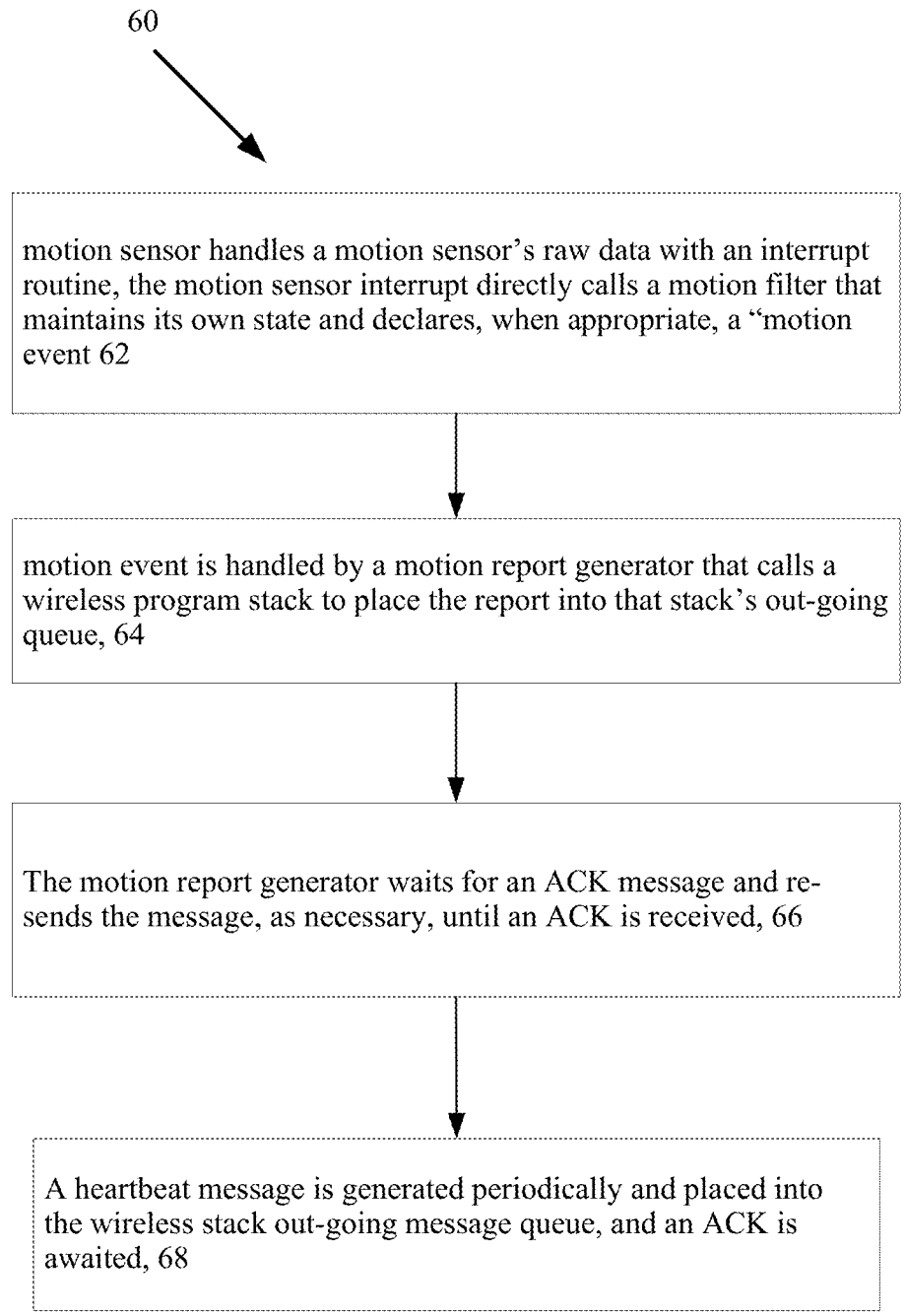
FIGS. 5-7 are flow charts depicting processing across distributed rules engines.

Referring to FIG. 5, a "typical" application 60 on a motion sensor handles a motion sensor's raw data with an interrupt routine, the motion sensor interrupts directly call a motion filter that maintains its own state and declares, when appropriate, a "motion event" 62. The motion event is handled 64 (after perhaps a bit of un-deterministic latency) by a motion report generator that calls a wireless program stack to place the report into that stack's out-going queue. The motion report generator waits 66 for an ACK message and re-sends the message, as necessary, until an ACK is received. A heartbeat message is generated 68 periodically and placed into the wireless stack out-going message queue, and an ACK is awaited. (Heartbeat messages are not re-submitted after delivery failure, but a new heartbeat message is not sent until the result of the previous send is obtained from the wireless stack.)

Figure 6:
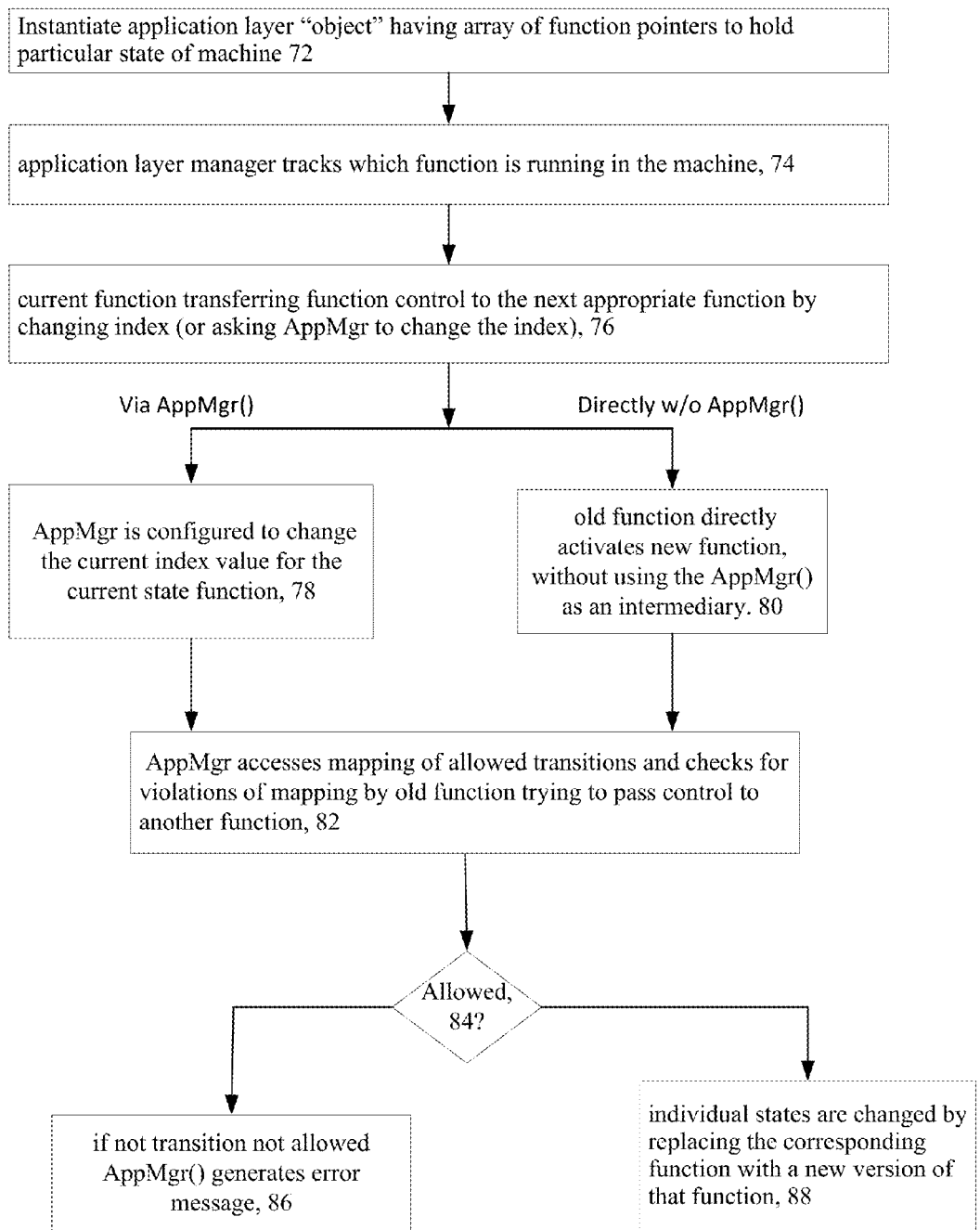

Referring now to FIG. 6, the application layer is configured to satisfy the requirement of modularity by defining and linking together different portions of the application layer so that individual portions are updatable over the wireless link without breaking the overall application processing. The application layer instantiates 72 an "object" that is a fundamental building block for the application layer "machine." The instantiated object uses an array of function pointers. Each function pointer serves as a "keeper", e.g., holding of a particular state of the corresponding function. The instantiated object also includes a special manager function (application layer manager 30 or "AppMgr") that tracks 74 which function is running in the machine (i.e., which array index value is in effect).

State transitions are accomplished by the current function transferring function control to a next appropriate function by changing 76 this index value (or asking AppMgr to change the index value. The AppMgr is general with "hard-wired" business logic residing in the individual state functions, rather than in the AppMgr and individual states are changed by replacing the corresponding function with a new version of that function, transmitted from an external host such as a server or gateway. Making changes to an allowed state transition (either adding a new transition or deleting an old one) is accomplished by replacing the functions that participate in the state with the new functions to perform the state change.

In some implementations, the AppMgr is configured 78 to actually change the current index value for the current state function, whereas in other implementations the old function directly activates 80 the new function, without using the AppMgr( ) as an intermediary. AppMgr( ) has a mapping 82 of allowed transitions and checks 84 for violations of this mapping (i.e., if a given function tries to pass control to another function and in so doing make a state transition that is not allowed) AppMgr( ) will prohibit the change and raise an exception. This functionality in AppMgr( ) helps to verify that changes to the state machine behavior are valid and that changes to the state machine behavior actually take place, since an error message will be generated by AppMgr( ) 86 when an erroneous state change is requested by a function. Otherwise, individual states are changed by replacing the corresponding function with a new version of that function, 88.

Example Application

Let p_AppFunc[i] be a pointer to the $i^{th}$ application function. Let N_i be the "current index" value maintained by AppMgr( ). N_i is a global variable that retains its value from one pass through AppMgr( ) to the next.

AppMgr is a root function that is executed by a scheduler such as in the operating system running on the edge device. AppMgr runs completely through every few milliseconds. Each time AppMgr( ) runs, AppMgr executes the function pointed to by p_AppFunc[N_i]. In some embodiments, the state machine can be implemented as a set of arrays, whereas in more complex implementations the state machine is implemented as a set of functions that are linked through a linked list to allow for an indeterminate number of states in the state machine.

For some states, only one function call may be required. That is, p_AppFunc[N_i] would run once and then N_i would change to a different value, say N_k so that on the next call of AppMgr( ), a different state would be entered (i.e., p_AppFunc[N_k] would run). For other states the corresponding function might run many times before N_i changes. An example of the single-run function would be the sending of a report. An example of the multi-run function would be the activity of a sensor filter that acts on raw data from a sensor device.

The various functions p_AppFunc[i] not only decide when they should request that AppMgr( ) make a state change, but these functions indicate what new function(s) (e.g., what new value(s) of N_i) AppMgr( ) should choose from, as AppMgr( ) is configured to be fairly generic and thus all business logic, including the description of transitions between states, is contained in the p_AppFunc[ ] functions.

Simultaneous Actions

The two p_AppFunc[ ] functions need to have different tasks done at the same time, for example, simultaneously filtering data from two sensors (e.g., de-bouncing a switch and filtering motion data from an accelerometer. One general approach to providing an AppMgr is to run two state functions at a time (execute both with each pass through AppMgr). Another approach keeps AppMgr simple and just requires that application states provided with code to make calls to each other and thus invoke each other. That is, p_AppFunc[N_i] requests execution of p_AppFunc[N_k] upon termination of execution of p_AppFunc[N_i] and vice versa. In effect, the two app functions split the time and attention of AppMgr without AppMgr planning for time sharing.

The various versions of p_AppFunc[ ] are maintained in an executable code repository in the gateway and cloud, and each such function can have an ID number that is used to differentiate one version of a function from another (and in many cases the differences in the generations or versions of the function may be small but important, so getting exactly the right ID number is important). Inside a given function, the requested change to a different function or state becomes very specific with respect to a code version, therefore it is logical that the parameter used by a function to request a state change (function change) is actually the ID number of the new function.

A simple way to manage versions is to give App Layer state functions their own file type. File type is maintained as one of the fields in the file index in, e.g., flash memory so that the initialization process of AppMgr( ) during bootup searches for files of that type in the flash memory, and produces the array of function pointers, with index i running from 0 to a maximum value, i_max.

During this initialization AppMgr( ) maps each value i to a function, p_AppFunc[i] and that function's corresponding function ID, and produces a table showing, for each function ID, the corresponding index value i, and the allowed state transitions (function IDs for functions reachable from the current function).

For example, during the course of operation of the current function, e.g., p_AppFunc[N_i] with its function ID, e.g., 0x31C7, the function might return to AppMgr( ) a return value of 0x396B. This return value is a request to run the function p_AppFunc[ ] having the function ID "0x396B." AppMgr( ) uses the state table to determine if request to run p_AppFunc[ ] having the function ID "0x396B is a transition that is allowed for function ID 0x31C7, and if so, what value of i corresponds to function 0x396B. If it is a valid request, AppMgr( ) sets N_i equal to the new value of i corresponding to function ID "0x396B and, upon next execution of AppMgr( ), the new function ID "0x396B would run.

During initialization of AppMgr( ) and the producing of the state table, simple graph analysis algorithms run to ensure that each state is reachable (no states are isolated) and to make sure that all states are part of a single state machine (i.e., there are not two smaller and totally separated sets of states). The state table validation also requires that no state transition can involve a transition to a non-existent function.

AppMgr( ) always has a stem state (idle state) with function ID 0x0001 that runs when the index N_i is undefined. Initialization of the state machine is done in a second state (initialize state) with its own generic function, with function ID 0x0000. Any time any of the functions change (e.g., by a wireless download of a new function or functions), AppMgr( ) will re-run function 0x0000 and then transition to state function 0x0001. It is a further requirement that one and only one of the user-supplied functions in the complete function set is identified as the entry state. This is the state called by 0x0001 automatically. From that point on the user-supplied functions request the state changes as part of their return values.

Returning to FIG. 3, in the state diagram and the table mentioned above, now is shown the table populated with the state transitions for the example application described above.

| Function Name (assigned externally) | Function ID (assigned externally) | Allowed Transitions (assigned externally) | Function Index (assigned by AppMgr) | Execution Type (assigned externally) |
|---|---|---|---|---|
| Motion ISR | 0x31C7 | 0x31A2 | 2 | On event |
| Motion Filter | 0x31A2 | 0x31C7 0x3362 | 3 | On event |
| Motion Report Generator | 0x3362 | None (AppMgr Idle) | 4 | On call |
| Heartbeat Generator | 0x33EB | None (AppMgr Idle) | 5 | Perpetual (this is also entry function) |
| AppMgr Idle | 0x0001 | | 1 | Perpetual |
| AppMgr Initialize | 0x0000 | | 0 | On boot, or when called by AppMgr Idle |

The above example is simple for purposes of illustration of the concept. However, more complex application sets can also be used. For example, suppose there are two "states" in a node—the first state corresponding to the perpetual running of functions A, B, and C in a continuous loop and the second state corresponding to the running of functions D and E in another perpetual loop. In the first state (the normal state) function A (the "entry function") runs to completion and requests to AppMgr( ) that it run function B. When function B is complete, it requests function C, which in turn requests function A. Because function A is the entry function and the loop A-B-C-A . . . is a closed loop, functions D and E will normally not run. However, under special conditions suppose function B, when it exits, requests function D rather than C. Function D and E then run in a loop (D-E-D-E . . . ) until one of them requests a function in the first loop. In this way, functions or sets of functions correspond to states, and functions operating in each state manage the state transitions.

When a function exits with no new function requested, AppMgr Idle will simply run the entry point function again. In some cases with very simple nodes, there may be NO entry function, in which case the idle function will just run itself until an event-initiated function is run.

Referring back to FIG. 4, a hypothetical (generic) situation where there are two states (State 1 with functions A, B, and C, and State 2 with functions D and E). State 1 is the normal state and has the entry point, Func A. Under special circumstances State 1 transitions to State 2 when Func B requests the execution of Func D rather than Func C. State 2 may exist for only one cycle (D-E-exit) or many (D-E-D-E- . . . -exit), but when exit occurs in this example, it does so without calling any function. By default then, the AppMgr's Idle function runs Func A since it is the entry point function.

The nodes may be implemented using any appropriate type of computing device, such as a mainframe work station, a personal computer, a server, a portable computing device, or any other type of intelligent device capable of executing instructions, connecting to a network, and forwarding data packets through the network. The nodes can execute any appropriate computer programs to generate, receive, and transmit data packets for use on the network.

Distributed Rules Engines for Robust Global Automation Networks

For some devices (such as gateways) the application layer flexibility discussed above is derived in particular from the use of rules engines in the form of independent software agents or rule implementation modules (independently running functions that check input conditions and react accordingly). See for example the routing/rules messaging discussed in the provisional application mentioned above.

For other devices (such as relatively constrained end-nodes) the application layer dexterity arises (as just one implementation example) from programmable state machine methods with the new element of dynamically loaded "root functions" that embody specific rules (typically one rule for each root function) and are run by the operating system of the end-device according to a function priority established for the system. These functions can be transmitted to an end-device in small messages (i.e., messages not containing a complete re-statement of the entire executable code base of the device) and installed and run quickly. Thus, the resulting edge architecture can support frequent updates.

FIG. 2 above illustrates a generic application layer with network message and sensor/processor peripheral based inputs, local data stores and lists, configuration management functions, rules set, and report generation capabilities. In FIG. 1 distributed rule engines are denoted by the circle element "R" at individual nodes or collections of nodes. Each of the three tiers shown in FIG. 1 (e.g., cloud/enterprise, gateway, and edge devices) has an application layer. Inputs to the application layer include parsed messages from the network layer and processor peripheral interrupts and polled sensor/peripheral input.

An application management process characterizes inputs sufficiently to apply rules that dictate changes in configuration, stored data, and/or precipitate message generation. However, in some of the devices the rules engines are distributed rule engines (denoted by the circle element "R", mentioned above) at individual nodes or collections of nodes. These distributed rules engines involve the generation of a message that is passed from an output of one device to an input to another device (i.e., an action/deferral) or a rule may determine an action based on a value of the input or a value of several inputs or otherwise a combination of several inputs, other data, and a current configuration of the node.

Figure 7:
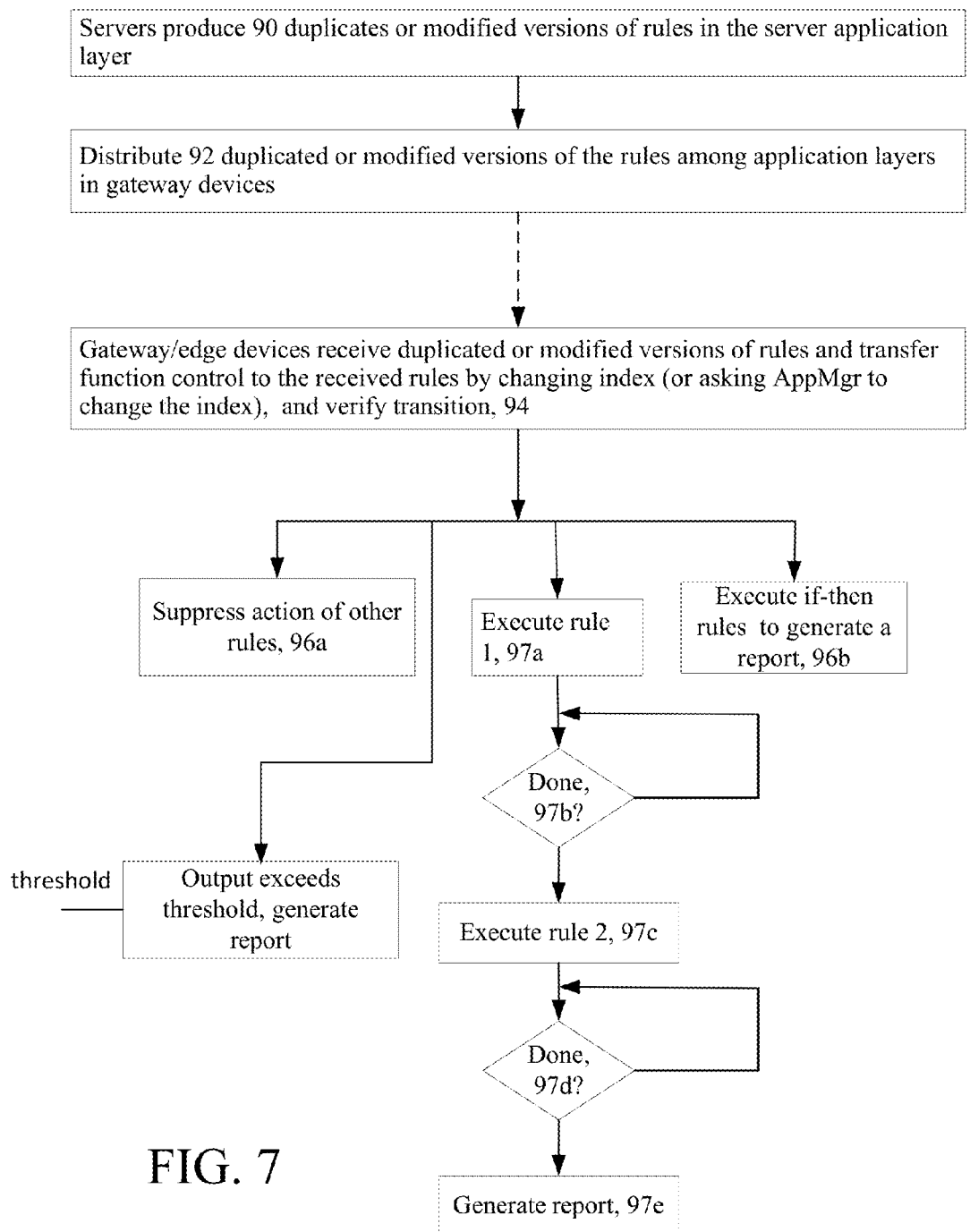

Referring now to FIG. 7, certain rules executed in the network of FIG. 1 are layered or subordinated or distributed. A rule can start execution in an application layer of a first one of the tiers discussed above, and the result of that execution produces or causes execution of a rule in an application layer of a different one of the three tiers discussed in FIG. 1.

The servers 14 in the cloud/enterprise tier 12a produce 90 duplicates or modified versions of rules in the server application layer (not shown). These servers 14 in the cloud/enterprise tier 12a distribute 92 these duplicated or modified versions of the rules among application layers (not shown) resident in gateway devices 16 in the middle tier 12b. Likewise, upper layer tiers delegate work to the edge application layer 12c by distributing (depicted also in 92) to the edge layer devices 18, 20 rules to execute.

In the receiving tier, the gateway/edge devices that received the duplicated or modified versions of such rules, for execution, the application layer in such devices transfers function control 94 to the received rules by changing index (or asking AppMgr( ) to change the index) and verify transition, as discussed above for FIG. 6. In the receiving tier the gateway/edge devices that received the duplicated or modified versions of such rules, execute the duplicated or modified versions of the rules at the received tier and results in the form of reports are generated and returned to the tier determined by the rule. Rules in the application layer of the edge layer 12c may be deleted or temporarily suppressed by the actions of the rules distributed from the other layers 96a.

Rules may take various logical forms, including the relatively simple "if-then" form 96b, reproduced below where the rule to produce a particular entry and generate a report is trigged if an input x is observed:

"if x input is observed, then produce local data entry y and generate report z)."

In addition, some rules may involve composite inputs, such as the if-then rule below that operates on inputs a, b, c, over a time period x to trigger an action, such as generate a report.

"if a, b, and c have occurred within time x, then generate report y"

Rules can also be cascaded to execute consecutively on the same or different engines by a first executing rule invoking a second rule 97a-97e, such as the example where when rule 1 is satisfied within a time period x, rule 1 (or AppMgr( ) activates rule 2, to generate a report if rule 2 is satisfied in period x.

"if rule 1 has been satisfied within time x, then activate rule 2; if rule 2 is satisfied within time x then generate report y"

Rules may be simple in form and yet involve relatively complex computations, such as involving a computation from a neural network.

"if the output of a neural network with the given 50 inputs exceeds threshold value x, then generate report y").

The distributed rules engines may be implemented using any appropriate type of computing device, such as a mainframe work station, a personal computer, a server, a portable computing device, or any other type of intelligent device capable of executing instructions, connecting to a network, and forwarding data packets through the network. The rule engines can execute any appropriate computer programs to generate, receive, and transmit data packets for use on the network.

Figure 8:
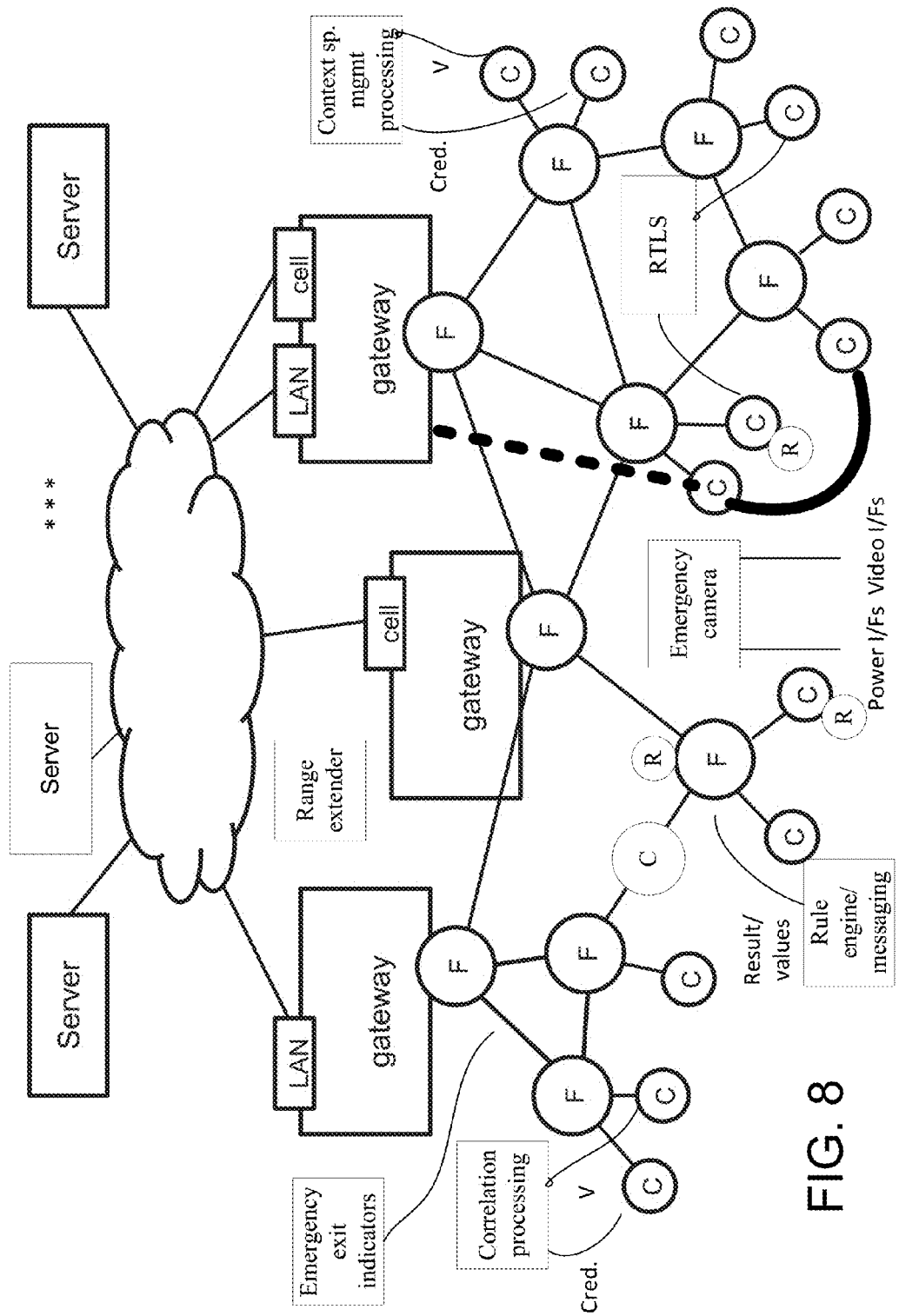
FIG. 8 is a block diagram of components of an example networked security system.

FIG. 8 shows an example of a security system having features of the WSN described with respect to FIG. 1 and having the various functionalities described herein. As shown in FIG. 8, correlation processing receives inputs from certain constrained nodes (although these can also be fully functional nodes). These inputs may include credential information and video information, and the correlation processing may produce correlated results that are sent over the network. Context management processing receives inputs from certain constrained nodes (although these can also be fully functional nodes) e.g., credential information and video and grouping information, and performs context processing with results sent over the network. The network supports operation of emergency exit indicators; emergency cameras as well as distributed rule processing and rule engine/messaging processing. Range extenders are used with e.g., gateways, and a real time location system receives inputs from various sensors (e.g., constrained type) as shown. Servers interface to the WSN via a cloud computing configuration and parts of some networks can be run as sub-nets.

The sensors provide in addition to an indication that something is detected in an area within the range of the sensors, detailed additional information that can be used to evaluate what that indication may be without the intrusion detection panel being required to perform extensive analysis of inputs to the particular sensor.

For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Program instructions stored in the memory, along with configuration data may control overall operation of the panel.

The monitoring server includes one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A device node, comprising:
   a processor running an operating system including an application layer; and
   memory in communication with the processor, the processor configured to:
   receive by an application layer manager that tracks an index of current functions running in the device at least one rule for execution by the application layer of the device node as one or more independent software agents that are received from a first tier of a plurality of tiers of a sensor network, with the one or more software agents being one or more dynamically loaded root functions that include either a duplication of the at least one rule or a modified version of the at least one rule;
   transfer function control to the received at least one rule by the application layer either changing the index or asking the application layer manager to change the index and to verify that a transition to the received at least one rule is an allowed transition; and
   execute the at least one rule included in the independent software agent by the operating system of the end-node according to an established function priority for the device node.

2. The device node of claim 1 wherein the loaded root function is received by the device node in small messages that are messages not containing a complete re-statement of an entire executable code installed on the device node.

3. The device node of claim 1 wherein the rules are cascaded rules and the cascaded rules are executed on plural rules engines at plural device nodes.

4. The device node of claim 1 further comprising generating a message that is passed from one device node to an input of another device node that specifies an action deferral.

5. The device node of claim 1 wherein the device node is configured as a device node for the first tier of the plurality of tiers and further comprises:
   generating a message including a result of execution of the rule to produce or cause execution of a different rule in an application layer of a different one of the plurality of tiers.

6. The device node of claim 1 wherein the device node is configured to execute a cascade rule to have two or more rules execute consecutively on same or different engines by a first executing rule invoking a second rule.

7. The device node of claim 1 wherein the device node is configured to execute a cascade rule that has two or more rules execute consecutively on the same or different engines by the cascade rule having a first executing rule with an object manager invoke a second, different executable rule.

8. A system, comprises:
   a first network supporting:
   a server tier that produces rules that are distributed among application layers resident in gateway devices;
   a gateway tier that receives the produced rules and is configured to transfer function control to received rules and which are coupled to the server tier by the first network;
   a second network
   plural nodes interconnected by the second network, and which are coupled to the gateway devices by the second network, each node comprising:
   a processor running an operating system; and
   memory in communication with the processor, with one of the plural nodes configured to;
   receive by an application layer manager that tracks an index of current functions running in the device at least one rule for execution by the application layer of the device node as one or more independent software agents that are received from a first tier in the network, with the one or more software agents being one or more dynamically loaded root functions that include either a duplication of the at least one rule or a modified version of the at least one rule and that are received in small messages that are messages not containing a complete re-statement of an entire executable code installed on the one of the plural nodes that includes at least one rule;

transfer function control to the received at least one rule by the application layer either changing the index or asking the application layer manager to change the index and to verify that a transition to the received at least one rule is an allowed transition; and execute the at least one rule included in the independent software agent by the operating system of an end node of the plural nodes according to an established function priority for the node.

9. The system of claim 8 wherein the rules are cascaded rules and the cascaded rules are executed on plural rules engines at the plural nodes.

10. The system of claim 8 further configured to:

generate a message that is passed from a first one of the plural nodes to an input of a second one of the plural nodes, with the message specifying an action deferral.

11. The system of claim 8 further configured to:

generate a message including a result of execution of the rule to produce or cause execution of a different rule in an application layer of a different one of the tiers.

12. The system of claim 8 wherein a first one of the plural nodes is configured to:

execute a cascade rule to have two or more rules execute consecutively on the processor of the first one of the plural nodes or different processors of the first one and a second one of the plural nodes by a first executing rule invoking a second rule.

13. The system of claim 8 wherein a first one of the plural nodes is configured to:

execute a cascade rule that has two or more rules execute consecutively on the processor of the first one of the plural nodes or different processors of the first one and a second one of the plural nodes by the cascade rule having a first executing rule with an object manager invoke a second, different executable rule.

* * * * *